R. S. T. CISSEL.

HOT AIR REGISTER.

No. 11,426. Reissued July 3, 1894.

Witnesses

Albert Speiden

B. W. Miller

Inventor

R. S. T. Cissel

By

Baldwin, Davidson & Light

Attorneys

UNITED STATES PATENT OFFICE.

RICHARD S. T. CISSEL, OF ELIZABETH, NEW JERSEY.

HOT-AIR REGISTER.

SPECIFICATION forming part of Reissued Letters Patent No. 11,426, dated July 3, 1894.

Original No. 479,586, dated July 26, 1892. Application for reissue filed March 11, 1893. Serial No. 466,652.

*To all whom it may concern:*

Be it known that I, RICHARD S. T. CISSEL, a citizen of the United States, residing at Elizabeth, in the county of Union and State of New Jersey, have invented certain new and useful Improvements in Hot-Air Registers, of which the following is a specification.

This invention relates to hot air registers of that class in which the pivoted slats are adjusted by means of a connecting rod pivotally connected with the slats and operated by a lever fulcrumed in the supporting frame.

The invention consists, in such a register, of an organization involving a locking surface on the frame of the register, a sheet metal piece or box that is prevented from turning by said surface and has a bushing in which the single bolt that passes through the side of the frame lies, an ordinary nut on the end of the bolt that is, with the sheet metal piece or box, prevented from turning, and the operating lever that has its bearing on said bushing between the sheet metal piece and the side frame of the register.

The invention further consists in an organization in which the pivoted slats are eccentrically connected by a governing rod operated by a lever that is pivoted to the supporting frame and retained by a nut seated in a sheet metal box having a central bushing for the screw pivot and a raised concentric friction flange, said box and contained nut being seated in an angularly recessed boss of the supporting frame, which boss serves to prevent the axial turning of the box and screw nut and the playing loose of the screw pivot.

The purposes of the invention are that the manipulation of the operating lever shall not cause movement of the bolt and loosening of the nut; the prevention of wabbling and noise and the retention of the lever in any position to which it may be adjusted; all by the use of the parts stated and a single ordinary securing bolt and ordinary nut.

Figure 1:
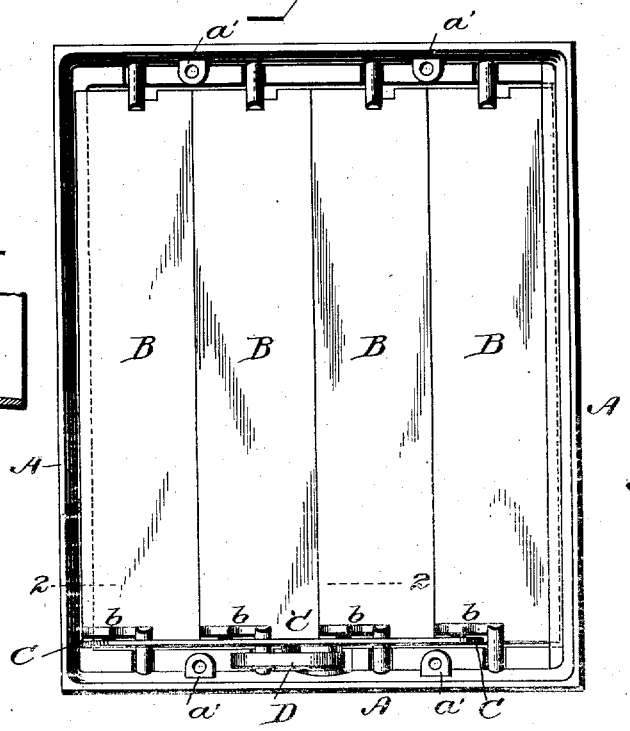
Figure 5:
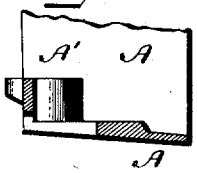
Figure 6:
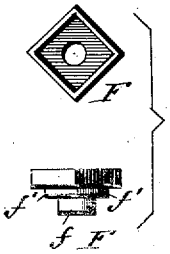
Figure 4:
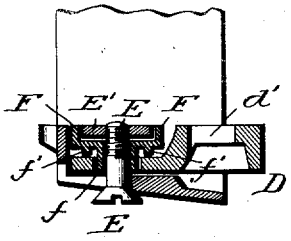
Figure 2:
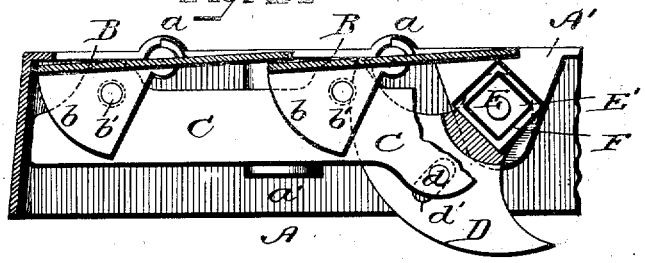
Figure 3:
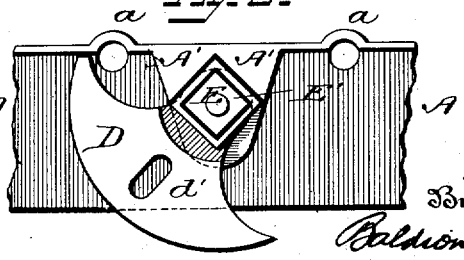

In the accompanying drawings, Figure 1 represents a front elevation of my improved hot-air register. Fig. 2 is a horizontal section of the same, with parts broken away, on the line 2, 2, Fig. 1. Fig. 3 is a detail top view of the operating-lever and its connection with the frame of the register, the governing-rod and the slats being detached. Fig. 4 is a vertical transverse section of the lever and its pivot connection with the supporting-frame; and Figs. 5 and 6 are respectively a vertical transverse section of the supporting-frame with the operating lever and its pivot removed and a top and side view of the sheet metal box for retaining the nut of the screw-pivot bolt of the operating-lever.

Similar letters of reference indicate corresponding parts.

Referring to the drawings, A represents the exterior supporting-frame of my improved hot-air register, which frame is provided on opposite sides with the usual socket-recesses *a* for the pivots on each end of the slats B B and with lugs *a'*, through which the fastening-screws of the open-work top or face-plate are passed. The lower ends of the slats B are provided with projecting lugs *b*, that are connected by a governing rod or bar C, provided with pivots *b'*, fitting into holes in the projecting lugs of the slats B, said pivots being arranged eccentrically to the pivots on which the slats swing in the frame. The governing-rod C is also connected by a pivot, lug or pin *d* with the slot *d'* of a segmental lever D, applied to a screw-pivot E on which the lever D swings when the slats are to be operated by means of the governing-rod C and moved in one or the opposite direction, according as it is desired to open or close the same. The screw pivot E is retained in the frame A and lever D by a screw-nut E'.

The parts so far described are well known, except that the arrangement of screw-pivot, lever, nut and locking surface of the frame as shown and hereinafter described is new with me.

The nut E' is shown seated in a sheet metal box F of square shape conforming to the nut and having a central bushing *f* that extends around the shank of the screw pivot E into the hole of the lever D, as shown clearly in Fig. 4.

At the under side of the sheet-metal box F is arranged a circular rim or flange *f'*, which is concentric to the bushing and which bears on the top part of the shank of the lever D and exerts a certain degree of friction on the same, so that the lever is held in any position to which it is placed.

To prevent the axial turning of the box F, and nut E′, the same are seated in an angularly-recessed boss A′, forming the locking surface that is made integral with the supporting-frame A, as shown in Figs. 3 and 5. This boss retains the box and screw-nut in position and prevents the playing loose of the same when operating the slats of the register. The screw-pivot E is inserted through the side piece of the frame, and the bushing of the box C on which the operating lever D has its bearing into the screw-nut E′ and screwed into the nut until the box is tightly adjusted on the lever D. When in this position, the detaching of the screw-nut from the screw-pivot is prevented by the recessed boss of the supporting-frame, and by the fact that the lever D turns upon the bushing and not upon the bolt, and the screw-pivot is prevented from withdrawing from the nut by the casing (not shown) in which the register frame is set. The connection of the operating-lever with the supporting-frame is not only produced by a single screw-pivot, but at the same time a frictional action is produced by the box on the lever, so that the same is prevented from wabbling and is retained in any position to which the same is adjusted either in opening or closing the register.

When the register is in a horizontal position in the floor, the recessed boss A′ imparts sufficient strength to the outer frame to resist the pressure exerted by the foot on the segmental lever, so as to permit the opening or closing of the register without injury to the frame or to the sheet-metal box in which the screw-nut is supported.

I claim as my invention—

1. In a hot air register, the combination, substantially as set forth, of the frame having the locking surface thereon, the pivoted slats, the governing rod pivotally connected with the slats, the operating lever pivotally connected with the governing rod, the sheet metal piece that is prevented from turning by said locking surface and which has a bushing formed thereon on which the operating lever has its bearing, the securing bolt that passes through the frame and through said bushing, and the nut on the end thereof that is, with the sheet metal piece, prevented from turning by said locking surface.

2. In a hot air register, the combination, substantially as set forth, of the frame having the recesses and locking surface, the slats pivoted in the recesses, the operating lever, the governing rod pivotally connected with the slats and operating lever, the sheet metal piece that is prevented from turning by said locking surface and which is formed with a bushing on which the operating lever has its bearing between the side of the frame and the sheet metal piece, the securing bolt passing through the side of the frame and said bushing and sheet metal piece, and the nut on the bolt.

3. In a hot air register, the combination, substantially as set forth, of the frame having the angularly recessed boss forming a locking surface, the pivoted slats, the operating lever, the governing rod pivotally connected with the slats and operating lever, the metal box lying in and prevented from turning by said angular recess and having a bushing formed thereon on which the operating lever has its bearing, the securing bolt passing through the side of the frame and through the bushing and the nut on the end of the bolt and lying in said box.

4. In a hot air register, the combination, substantially as set forth, of the frame having the locking surface, the pivoted slats, the operating lever, the governing rod, pivotally connected with the slats and with the operating lever, the metal piece prevented from turning by said locking surface and having a bushing and a concentric friction rib or flange surrounding the bushing, the bolt passing through the side of the frame and said bushing, and the nut on the bolt, the operating lever having its bearing on said bushing between the friction flange and the side of the frame.

5. In a hot air register, the combination of a supporting-frame having an angularly-recessed boss, slats pivoted to said frame, a governing-rod pivoted eccentrically to said slats, an operating-lever pivoted to the governing-rod, a screw-pivot passed through a slot in the supporting-frame and the shank of the operating-lever, a nut engaging said screw-pivot, and a centrally-perforated sheet-metal box passed over said screw-pivot and lying between the operating lever and the nut and seated in the recessed boss of the supporting-frame, said box having upturned flanges embracing the sides of the nut and provided upon its under side with a central bushing surrounding the screw-pivot, on which bushing the operating lever has its bearing and a raised concentric flange exerting a frictional action on the operating-lever, substantially as described.

RICHARD S. T. CISSEL.

Witnesses:
EDWARD C. DAVIDSON,
CATHARINE GEORGI.